July 5, 1960        J. R. OUTT        2,944,250
METEOR PARTICLE IMPACT SENSING APPARATUS
Filed Jan. 24, 1958
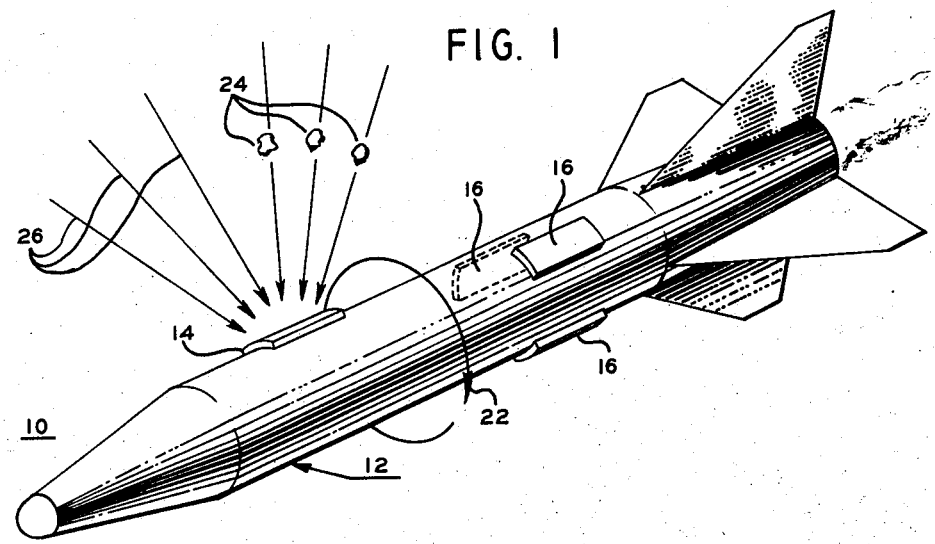
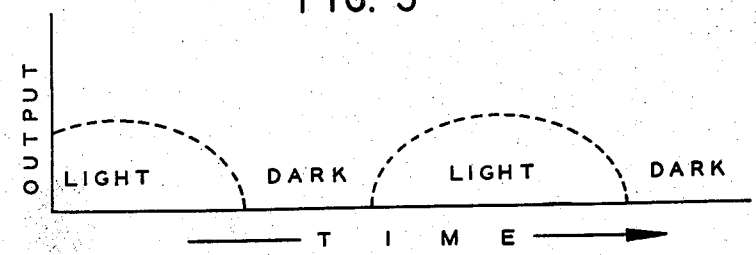
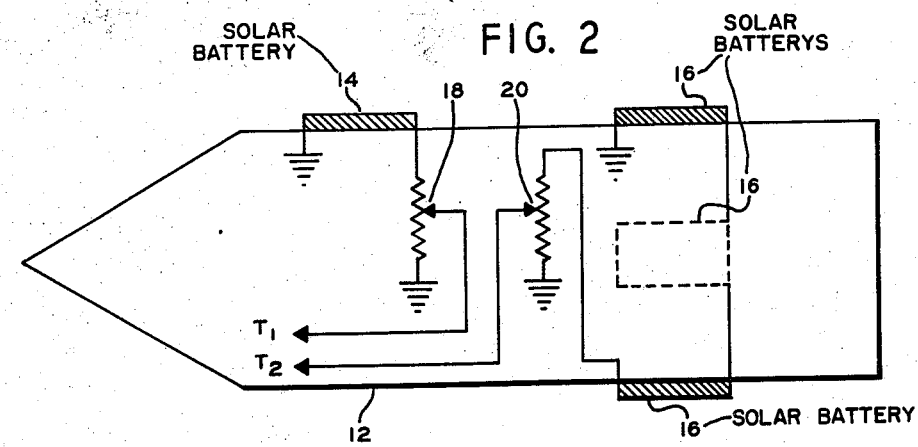
Inventor
JOHN R. OUTT
BY Alfred B. Levine

United States Patent Office 2,944,250
Patented July 5, 1960

2,944,250

METEOR PARTICLE IMPACT SENSING APPARATUS

John R. Outt, Malvern, Pa., assignor to General Electric Company, a corporation of New York Filed Jan. 24, 1958, Ser. No. 710,997

1 Claim. (Cl. 340—201)

The present invention relates to a meteor particle sensing apparatus and more particularly to a meteor particle impact sensor and surface abrasion gage for high speed vehicles.

It has been desirable to obtain sensing devices applicable to detecting and measuring the effect of high velocity dust or particles on the surface condition of a high speed missile's skin structure. Generally, prior methods of sensing meteor particles impacting upon the skin of a high speed vehicle has been the use of a condensor microphone which acts as a transducer to convert meteor impacts into electrical signals. Modifications have been used wherein a piezoelectric crystal has been suitably secured on the missiles surfaces which, however, still amounts to an acoustic-transducer method of sensing meteor particles. A further method utilized to sense meteor particles has been the use of a metal tape transducer whereupon the landing or retrieving of the missile, the tape is recovered and examined on the ground or electrically scanned, such as by a photocell, and the roughening parameter is converted into an electrical signal.

Such presently utilized systems, as the acoustic type or the like, are undesirable in that their sensitivity to acoustic noise as well as particle impact, can't be satisfactorily distinguished from each other. Attempts have been made to reduce spurious response in acoustic systems by tuning the amplifier to some frequency between 50 and 150 kilocycles. However, even with a sharp bandpass characteristic incorporated into the system's amplifier, there still is no satisfactory guarantee that in flight, noise within this band-pass may not be generated that cannot be demonstrated to exist or not to exist anywhere in the missile by ground testing of the missile. The systems which recover samples of an eroded surface or telemeter its parameters, such as the metal tape transducer, are endowed with an inherently large degree of structural or signal transmitting deficiencies or failures which would greatly limit their use.

The present invention utilizes a solar battery method of detecting meteor particles which depends on the abrading or eroding affect of high velocity perticles impacting upon a surface. Hence, a meteor particle sensing device is obtained which gives a high-level output which does not require, for example, conversion devices such as amplifiers and rectifiers. In this manner, the present invention differs from the prior known sensing methods which are sensors of low level outputs and require A.C. or D.C. amplifiers. Accordingly, information regarding mass per unit time, particle number per unit time and particle-size distribution needed for calculating effects on skins of missiles and space vehicles, can be correctly and efficiently obtained.

Briefly, the present invention comprises one or more solar batteries mounted on the surface of a high speed vehicle and provided with means for telemetering the output to a ground station, so that as the missile rotates the output varies from zero to maximum in a periodic fashion. The amount of the maximum output of current or voltage falls off as the active surface of the solar battery is punctured or eroded away by sand blasting affect of meteor particles. The present system is calibrated to act as an accurate gage or measure of the integrated eroding effects of a large number of very small-velocity particles. This is also a measure of the amount of surface roughening effect of the polished missile skin and the two effects can be correlated or calibrated, one against the other.

An object of the present invention is the provision of a meteor particle sensing apparatus for measuring the effect of high-velocity dust particles, or the like, on the surface condition of a high speed vehicle skin.

Another object is to provide a meteor particle impact sensor and surface abrasion gage to detect and measure the effect of meteor particles on the surface of a high speed vehicle.

A further object of the invention is the provision of a meteor particle sensing device having a high-level output without necessity of conversion devices, such as amplifiers, and rectifiers.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

Figure 1 is a perspective view of a preferred embodiment of the invention;

Figure 2 is a cross-sectional view, greatly exaggerated for purposes of illustration, illustrating the electrical connections between the various solar batteries; and Figure 3 is a plot of the solar battery output versus time illustrating the periodic fashion that the output varies from zero to a maximum as the missile rotates in its flight.

Referring now to the drawings, in Fig. 1 there is illustrated a preferred embodiment 10 comprising a high speed vehicle 12 having a number of solar batteries 14 and 16 suitably mounted thereon. Briefly, a solar battery is very sensitive to the abrasion of its exposed or light-sensitive surface by such action as sand blasting, or the like. Hence, suitable types of solar batteries are utilized as sensors for micrometeorites or cosmic dust encountered by space vehicles flying above the earth's atmosphere.

The solar batteries of such a type as a silicon solar cell battery, or the like, can be located on any fore, aft, or side surface of the missile. For example, solar battery 14 may be suitably located on the fore portion of the missile substantially close to the nose cone section thereof, while solar batteries 16 may be circumferentially spaced near the aft portion of the missile 12. The solar batteries 14 and 16 are of the type which have a very thin sensitive layer only on its outer surface. The batteries are installed on the outer skin of the missile 12 without any protective layer of glass or plastic thereover, and in a flush attitude with the surface thereof.

Solar battery 14 is utilized to indicate missile roll rate and missile aspect angle of attack, while the solar batteries 16 equally spaced about the circumference of the missile so that the output of the plurality of batteries in series or parallel will remain more or less constant, serve as a means of measuring the integrated eroding effects of the high-velocity meteorite particles. For example, solar battery 14 indicates the roll rate and aspect angle of attack of the missile by correlating solar battery output with other known missile characteristics, for example, pressure variations, magnetic flux, or the like, to give the desired missile flight characteristics.

Figure 2 shows a typical circuitry for the solar batteries, wherein solar battery 14 is shown electrically coupled to a telemetry transmitting channel $T_1$ through a voltage divider 18, while solar batteries 16 are electrically coupled, in series, to a telemetry transmitting channel $T_2$ through a voltage divider 20. In this manner, the solar batteries measure the eroding effect directly and not as an indirect result of such an output as noise. Also, as can be seen, there is no necessity for complicated mechanical devices, such as a metal tape transducer, or the like. Further, there is no requirement for amplification or conversion of the electrical output signal because enough solar cells or batteries can be arranged in series or series-parallel to be compatible with any telemetry system. As previously mentioned, the solar batteries can be located on any portion of the missile surface, since the meteor particles travel faster than any missile speed now contemplated and will overtake it and collide with any portion of the missile's surface. As can be surmised, the solar battery method is applicable to substantially integrating the eroding effect of meteor particles on the outer walls of a space ship.

In the operation of the embodiment 10 of Fig. 1, as the missile rotates about its axis, as indicated by the arrow 22, the output of the solar cell 14 in response to the sun rays 26 varies from zero to maximum, as shown in Figure 3, in a periodic fashion. The amount of the maximum output of current or voltage, telemetered through $T_1$ and $T_2$, falls off as the active surface is punctured or eroded away by the sand blasting effect of meteor particles 24. The solar battery 14 can then be calibrated to act as an accurate gage or measure of the integrated eroding effects of a large number of very small high velocity particles so that the solar battery output can be correlated with other known missile flight characteristics, such as the pressure variations and magnetic flux to indicate the roll rate and the aspect angle of attack of the missile.

Further, the solar battery output versus time curve, shown in Figure 3, also serves as an indication of when the missile has reached a certain altitude or a certain atmospheric density. The reason for this is that meteors slow down and the larger ones burn up, when they enter the earth's atmosphere and the slower particles will have greatly reduced penetrating and eroding effect on the missile surface. If deemed desirable, as the solar batteries deteriorate, they can be replaced by an indexing mechanism, not shown, or by mounting them in film-holder type apertures, not shown, arranged so that the film-holders successfully slide open one at a time.

In this manner, the present invention provides a low cost, light weight, meteor sensing device with practically no space required within the missile. In comparison with known meteorite sensors, the present invention has a high-level D.C. output, and requires no amplification. In further comparsion with moving-tape type of sensors, the present invention requires no moving parts, photocells, or low-level D.C. amplifiers. In comparison with acoustic microphone sensors, the present invention requires no low-level A.C. amplifier and is unaffected by spurious affects, such as acoustic noise generated inside the missile. In comparison with still other types of sensor devices, the present invention requires no recovery of films or objects after the flight has terminated and can be used on a non-recoverable satellite since the output of the solar batteries are transmitted to the ground through telemetry transmitting channels, such as $T_1$ and $T_2$. Finally, solar batteries are more sensitive to the eroding affect of very fine grain space dust than previously known meteorite sensors.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claim.

I claim:

A meteor particle impact sensing device for a high velocity missile, comprising a single solar battery mounted on the surface of the fore portion of the missile, three solar batteries mounted on the surface of the aft portion of the missile equally spaced about the circumference thereof and exposed to the impact of particles, a first and a second telemetry transmitting channel, said single solar battery electrically coupled to said first transmitting channel and said three solar batteries electrically coupled to said second transmitting channel, whereby the output of said solar batteries is proportional to the integrated eroding effect of a large number of very small velocity particles on the surface of the missile.

References Cited in the file of this patent

UNITED STATES PATENTS

| 2,286,036 | Lamb | June 9, 1942 |
| 2,755,704 | Gilbert | July 24, 1956 |
| 2,873,303 | Rittner | Feb. 10, 1959 |
| 2,897,720 | Offner | Aug. 4, 1959 |

OTHER REFERENCES

The Journal of Space Flight, November 1951, published by the Chicago Rocket Society (pages 1–3 relied on).

Electrical Engineering, November 1957, published by AIEE (pages 979–980 relied on).

Journal of British Interplanetary Society, July–August 1956 (page 189 relied on).

Spaceflight, October 1956, vol. 1, No. 1, pages 15–28 (by Gatland).

Journal of the British Interplanetary Society, July–August 1956, pages 182–188 (by Foley et al.).

Aero Digest, April 1956, pages 36–37 (by Singer).

Jet Propulsion, May 1956, pages 364–368 (by Stuhlinger).

Journal of the British Interplanetary Society, March 1954, pages 74–79 (by Singer).

The Engineer, Aug. 17, 1956, pages 247–249.